June 16, 1942.  C. H. STEENSTRUP  2,286,693
FREEZING TRAY
Original Filed June 8, 1937
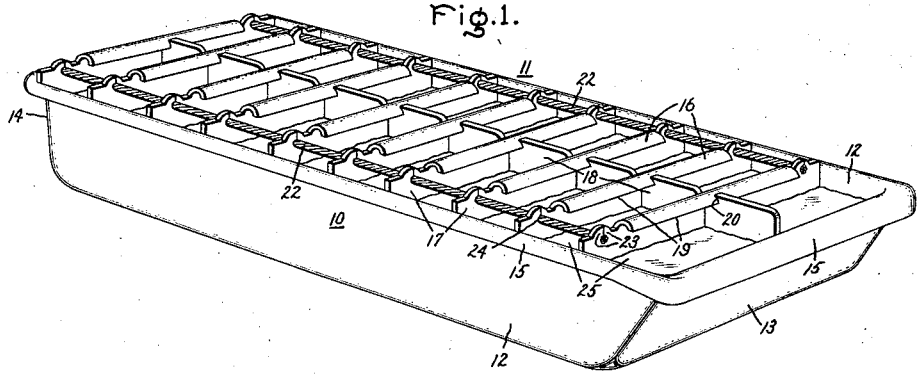
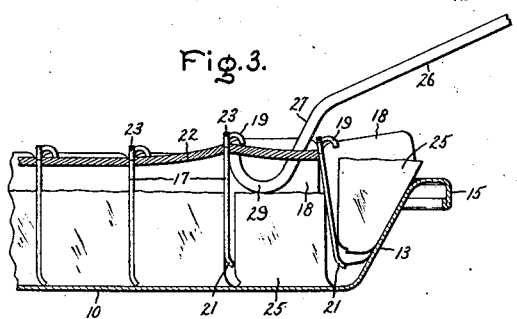 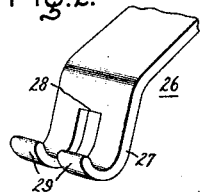
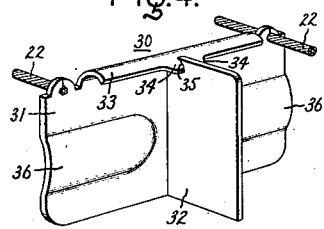 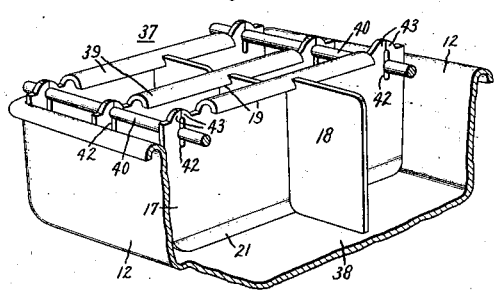
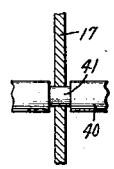
Inventor:
Carl H. Steenstrup,
by Harry E. Dunham
His Attorney.

Patented June 16, 1942

2,286,693

UNITED STATES PATENT OFFICE 2,286,693

FREEZING TRAY

Carl H. Steenstrup, Schenectady, N. Y., assignor to General Electric Company, a corporation of New York Original application June 8, 1937, Serial No. 147,056. Divided and this application March 21, 1940, Serial No. 325,141

7 Claims. (Cl. 62—108.5)

My invention relates to freezing trays employed in refrigerating machines for producing ice locks and the like and is a division of my copending application Serial No. 147,056, filed June 8, 1937, which has now matured into Patent No. 2,265,705.

Many types of refrigerating machines, and particularly those adapted for household use, are provided with a freezing tray supported on a surface of a cooling unit associated with the refrigerating machine for producing ice. A partition assembly is commonly provided in the freezing tray in order to divide the same into a number of small compartments, so that the ice will be frozen in the form of small blocks or cubes. The partition assembly is frequently separate from the freezing tray and removable therefrom in order to facilitate the release of the ice blocks.

In my above-mentioned copending application I have disclosed and claimed a partition assembly for freezing trays which is made up of a plurality of similar partition elements. These elements may be secured together in assembled relation in such a manner as to afford limited independent relative movement between the several partition elements in order to facilitate the release from the compartment walls formed by the elements.

It is an object of my present invention to provide a partition assembly for freezing trays comprising a plurality of similar partition elements forming a plurality of ice block compartments and including an improved arrangement for retaining the partition elements in assembled relation and for accommodating relative movements between the partition elements to facilitate the release of the ice blocks therefrom.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 is a perspective view of a freezing tray and a partition assembly embodying my invention shown with ice blocks frozen in the several compartments formed by the assembly; Fig. 2 is a fragmentary perspective view of a lever employed in releasing the ice blocks from the freezing tray and the partition assembly; Fig. 3 is a fragmentary side elevational view partly in section of the freezing tray and partition assembly shown in Fig. 1 and illustrating the mode of operation of the lever shown in Fig. 2; Fig. 4 is a perspective view of a modified form of partition element for the assembly shown in Fig. 1; Fig. 5 is a fragmentary perspective view of a freezing tray and a modified form of partition assembly; and Fig. 6 is an enlarged fragmentary sectional view of an element of the partition assembly shown in Fig. 5.

Referring now to the drawing, in Fig. 1 I have shown a shallow rectangular freezing tray 10 having a recess containing a removable partition assembly 11. The freezing tray 10 is provided with a substantially flat bottom wall and an upwardly directed marginal wall forming sides 12 and front and rear ends 13 and 14 respectively, a downwardly turned marginal rim 15 being provided about the upper edge of the marginal wall of the freezing tray. The partition assembly 11 comprises a plurality of individual and similar partition elements 16 arranged in series within the freezing tray. Preferably the freezing tray 10 and each of the partition elements 16 are made of sheet aluminum but may be made of any other suitable material.

Each of the partition elements 16 comprises a vertically extending transverse dividing wall 17 and a vertically extending longitudinal dividing wall 18 secured in any suitable manner to the transverse dividing wall 17 adjacent the center thereof and extending outwardly therefrom. The longitudinal dividing wall 18 together with the transverse dividing wall 17 cooperate with the freezing tray to provide a pair of adjacent ice block compartments. The transverse dividing wall 17 is provided with a laterally projecting curved flange or shoulder 19 adjacent the upper edge thereof and extending over each of the ice block compartments. The flange 19 constitutes an abutment and such an abutment may be made in any suitable manner as by forming the partition element in any convenient manner by providing openings in the partition element or by attaching thereto any desired element. The flange 19 is also downwardly turned and provided with a slot 20 therein providing abutments engaging opposite sides of the longitudinal dividing wall 18 to brace the longitudinal dividing wall against lateral movement. The transverse dividing wall 17 of each partition element is also provided with a downwardly inclined flange or projection 21 along the lower edge thereof as shown in Fig. 3, and extending toward each of the ice block compartments formed by the partition element 16. This latter flange facilitates mechanical release of the ice blocks from the freezing tray 10. The longitudinal wall 18 of the partition element 16 adjacent the front end 13 of the tray has its end remote from the transverse element 17 cut to conform to the inclined inner face of the end wall 13.

The individual partition elements 16 of the partition assembly 11 are arranged in juxtaposed relation in the freezing tray 10 with the longitudinal dividing wall 18 extending in the same direction toward the front end 13 of the freezing tray and in substantial alinement along the center line of the partition assembly. The partition elements are retained in assembled relation by a pair of elongated flexible connectors 22 formed of steel wire or any other suitable material and secured to the transverse dividing walls 17 and disposed on opposite sides of the longitudinal dividing walls 18 of the individual partition elements. Preferably the connectors 22 are formed of twisted plural strand stainless steel wire as such material is very strong and flexible. The flexible connectors 22 are secured in place in the transverse walls 17 by a plurality of upstanding tabs 23 which have an opening 24 therebetween to accommodate the connectors 22. When the connectors 22 are to be secured in place, they are placed between the tabs 23 which are then bent toward each other about the connectors to securely grip the same, the openings formed between the tabs being tightly closed about the connectors. The flexible connectors 22 provide for free swinging movements of the partition elements 16 with respect to each other and to the freezing tray 10 to facilitate the release of the ice blocks from the partition assembly and from the freezing tray and to allow the partition elements from which ice blocks have been released to be swung out of the tray so that the blocks can easily be removed from the tray.

When the freezing tray and partition assembly are to be used, the assembly is placed within the tray which is then filled with water and the tray is placed upon the freezing shelf of a cooling unit of a refrigerating machine. The water level of the tray will be below the flanges 19 as these flanges are above the upper edge 15 of the freezing tray. After the water contained in the freezing tray has been frozen to provide ice blocks 25 in the compartments formed by the partition elements, the tray is removed from the cooling unit and a desired number of pairs or all of the ice blocks are released from the freezing tray and from the partition assembly for use as desired. The ice blocks 25 are mechanically released from the freezing tray and from the partition assembly by employing a lever or element 26 shown in Fig. 2. The lever 26 is provided with a bifurcated curved end 27 having a slot 28 and two spaced apart curved arms 29. The adjacent pairs of ice blocks 25 are released successively from the front end of the freezing tray toward the rear end thereof, the front end 13 being upwardly inclined in order to facilitate the release of the pair of ice blocks 25 adjacent thereto.

In releasing a pair of ice blocks 25 from the freezing tray and the partition assembly, the lever 26 is brought into engagement with one of the partition elements 16 as shown in Fig. 3. The slot 28 in the curved end of the lever straddles the longitudinal dividing wall 18 and the outer ends of the spaced apart curved arms 29 engage the flange 19 of the partition element on opposite sides of the longitudinal dividing wall 18. The lower surfaces of the curved arms 29 of the lever engage adjacent top surfaces of the ice blocks 25 on opposite sides of the longitudinal dividing wall 18. In order to release the ice blocks from the tray and the partition element, the outer end of the lever is depressed causing the lower surfaces of the curved arms 29 to fulcrum on the top surfaces of the ice blocks and exert a lifting force upon the partition element 16. The element 16 is thereby lifted, its movement being translatory in the planes of its walls and causing the frozen bonds between the ice blocks 25 and the walls of the element 16 to be broken. As soon as the element 16 is lifted with respect to the ice blocks and from the freezing tray, the downwardly inclined flange 22 adjacent the lower portion of the dividing wall 17 causes a longitudinal force to be exerted against the sides of the ice blocks adjacent the walls 17 which moves the blocks toward the front end 13 of the tray and breaks the frozen bonds between the ice blocks and the tray. By the single operation of the lever the ice blocks 25 adjacent the selected partition element 16 are thus released both from the tray and from the element. In Fig. 3, the element adjacent the front end 13 of the tray is shown lifted from the tray after the release of the ice blocks 25 adjacent thereto by the initial translatory movement of the element, and the lever 26 is shown in its depressed position just after release of the ice blocks 25 from the second partition element. It will readily be evident that after the release of the first two pairs of ice blocks as shown in Fig. 3, the lever may be removed and the first two partition elements swung out of the tray on the flexible connectors 22 so that the ice blocks may be removed without disturbing the ice blocks remaining frozen in the tray. Adjacent pairs of ice blocks 25 may then be released in a similar manner until a desired number or all of the ice blocks have been released. Since the blocks are released in pairs only a relatively small force is required at each application of the lever, and furthermore, this arrangement has the advantage of providing for ready removal of a small number of ice blocks without the necessity of breaking the frozen bonds between all the ice blocks in the tray.

In Fig. 4 I have shown a modified form of partition element 30 which comprises a transverse dividing wall 31 and a longitudinal dividing wall 32 secured to the transverse wall in any suitable manner and adapted to cooperate with a freezing tray to form an adjacent pair of ice block compartments. The transverse dividing wall 31 of the partition element 30 is provided with a laterally projecting flange or shoulder 33 adjacent the upper portion thereof and extending over each of the ice block compartments and constituting an abutment in the same manner as the flange 19 in Fig. 1. The flange 33 is employed in the same manner as the flange 19 to mechanically release the ice blocks in the freezing tray and partition element. In the construction shown in Fig. 4, the flange 33 is downturned somewhat less than the flange 19 in Fig. 1 in order to insure that the arms 29 provided on the bifurcated curved end of the lever 26 will not engage the outer edge of the flange and bend the same during the release of the ice blocks. This is accomplished by cutting off a portion of the flange 33. It will be observed that a portion of the outer edge of the flange 33 which is cut off stops short of the longitudinal dividing wall 32 in order to provide a pair of downwardly turned tabs 34 disposed on opposite sides of the longitudinal dividing wall and cooperating with a slot 35 formed in the flange 33 to form abutments for bracing the longitudinal dividing wall against lateral movement. Furthermore, a pair of indentations 36 are formed in the wall 31 and extend toward the ice block compartments in order to facilitate the release of the ice blocks by shifting the blocks in the manner accomplished by the action of the flange 22 as illustrated in Fig. 3. A plurality of the partition elements 30 may be secured together by flexible connectors 22 in the same manner as shown in Fig. 1.

A modified form of partition assembly 37 is shown in Fig. 5 arranged in a freezing tray 38. This partition assembly comprises a plurality of individual partition elements 39 of substantially the same construction as shown in Fig. 1, and corresponding parts have been designated by the same numerals. The partition elements 39 are retained in assembled relation in such a manner as to be relatively movable with respect to each other by elongated connectors or rods 40 having reduced portions 41, as shown in Fig. 6, slidably fitted in vertical slots or openings 42 in each side of the transverse dividing walls 17. The opposite ends of the rods 40 are supported on the upper edges of the ends of the freezing tray and the reduced portions 41 are retained in the upper ends of the vertical slots 42. The slots are preferably arranged above the top of the ice blocks to avoid the formation of ice in the slots which would interfere with the vertical sliding of the partition elements on the rods. When one of the partition elements is pried upwardly as is the first element shown in Fig. 6, to break the ice blocks lose therefrom and from the freezing tray, the vertical slots 41 provide for upward translatory movement of the partition element 39 with respect to the other partition elements. In making this partition assembly, the vertical slots 42 are formed so as to be open at the top and the reduced portions 41 of the supporting rods 40 are arranged in the slots. The upper ends of the slots are then closed by forcing together the opposing sides or ears 43 formed at the top of the slots. It will be noted that the transverse wall 17 of the partition element may be moved a limited distance longitudinally of the rods 40 since the reduced portion 41 is wider than the thickness of the wall 17.

During the operation of the partition assembly shown in Figs. 5 and 6, it is contemplated that all the ice cubes formed within the tray are to be released in succession from one end of the tray to the other before the partition assembly is removed from the tray, it being evident that the rods 40 are not sufficiently flexible to be swung outwardly in the same manner as the flexible connectors 22 in the modification shown in Fig. 2.

While I have shown and described particular embodiments of my invention, modifications thereof will be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States, is:

1. A removable partition assembly for freezing trays comprising a plurality of similar partition elements adapted to form walls of a plurality of ice block compartments, each of said elements having an opening therein in its upper portion, and means including an elongated connector passing through the opening in each of said elements for retaining said elements in assembled relation, said means providing for independent relative translatory movements of said partition elements in the planes of their surfaces to facilitate the release of ice blocks from compartments formed by said partition elements.

2. A removable partition assembly for freezing trays comprising a plurality of similar partition elements, each of said partition elements including a transverse dividing wall and a longitudinal dividing wall extending from one side of said transverse dividing wall and adapted to form walls of a plurality of ice block compartments, said partition elements being arranged in juxtaposed relation with said longitudinal dividing walls extending in the same direction and in substantial alinement, each of said partition elements having an opening in the upper portion thereof, and means including a rod passing through said openings in said partition elements for retaining said partition elements in assembled relation, said rod fitting loosely in said openings and providing for limited independent relative movements between said partition elements to facilitate the release of ice blocks from compartments formed thereby.

3. A partition assembly for freezing trays comprising a plurality of similar partition elements adapted to form walls of ice block compartments, each of said partition elements having an upright slot in the upper portion thereof, and means including a rod passing through the slot in each of said partition elements for retaining said partition elements in assembled relation, the portions of said rod passing through said slots being of reduced cross-section to retain said partition elements in spaced relation, said rod providing for limited independent relative movements between said partition elements to facilitate the release of ice blocks from compartments formed thereby.

4. A removable partition assembly for freezing trays comprising a plurality of similar partition elements forming walls of a plurality of ice block compartments, and means including a flexible strand secured to each of said partition elements for retaining said partition elements in assembled relation, said flexible strand providing for limited independent relative movements between said partition elements to facilitate the release of ice blocks from said compartments.

5. A removable partition assembly for freezing trays comprising a plurality of similar partition elements, each of said partition elements including a transverse dividing wall and a longitudinal dividing wall extending from one side of said transverse dividing wall and forming walls of a plurality of ice block compartments, said partition elements being arranged in juxtaposed relation with said longitudinal dividing walls extending in the same direction and in substantial alinement, and means including a flexible strand secured to each of said transverse dividing walls for retaining said partition elements in assembled relation, said flexible strand providing for limited independent relative movements between said partition elements to facilitate the release of ice blocks from said compartments.

6. In combination with a freezing tray, a partition assembly comprising a plurality of partition elements and cooperating with said freezing tray to form a plurality of ice block compartments, means including a flexible strand secured to each of said partition elements for retaining said partition elements in assembled relation, and means adapted to lift one of said partition elements with respect to said freezing tray and to the other partition elements for breaking frozen bonds between an ice block disposed in one of said compartments and said freezing tray and between said ice block and said one partition element.

7. A removable partition assembly for freezing trays comprising a plurality of similar partition elements, each of said partition elements including a transverse dividing wall and a longitudinal dividing wall extending from one side of said transverse dividing wall and forming walls of a plurality of ice block compartments, said partition elements being arranged in juxtaposed relation with said longitudinal dividing walls extending in the same direction and in substantial alinement, and means including a pair of flexible strands for retaining said partition elements in assembled relation, the individual strands of said pair of strands being disposed on opposite sides of said longitudinal dividing walls and secured to said transverse dividing walls, said flexible strands providing for limited independent relative movements between said partition elements to facilitate the release of ice blocks from said compartments.

CARL H. STEENSTRUP.